United States Patent [19]
Hall et al.

[11] Patent Number: 6,124,573
[45] Date of Patent: Sep. 26, 2000

[54] METALLIZED GRAPHITE HEATER FOR A HIGH-PRESSURE HIGH-TEMPERATURE REACTION VESSEL

[76] Inventors: David R. Hall; Joe Fox; Ronald Brian Crockett; Damon B. Crockett, all of 2185 S. Larsen Pkwy., Provo, Utah 84606

[21] Appl. No.: 09/473,147

[22] Filed: Dec. 28, 1999

[51] Int. Cl.[7] .................. H05B 5/10; F27B 5/14; F27B 5/08; F27D 1/00; B01J 3/06
[52] U.S. Cl. .......................................... 219/407; 373/127
[58] Field of Search .................................... 219/385, 391, 219/406, 407, 427, 409; 373/111, 116, 118, 127, 134; 266/252

[56] References Cited

U.S. PATENT DOCUMENTS 3,752,456  8/1973  Larker ............................ 266/252
4,103,100  7/1978  Kabayama et al. ............... 373/127
4,247,735  1/1981  Rigatti-Luchini ................. 219/427

FOREIGN PATENT DOCUMENTS 7-80275  3/1995  Japan .

Primary Examiner—Joseph Pelham

[57] ABSTRACT

This invention presents a high-pressure high-temperature reaction vessel having a metallized graphite heater for improved performance. The metallized heater consists of a graphite tube comprising a refractory metal. Metallization of the graphite heater is accomplished either by coating the graphite tube with a refractory metal, by intermixing a refractory metal in the graphite, or by positioning a refractory metal sheet or cylinder adjacent the graphite heater. The refractory metal constrains the graphite heater, adds toughness to the heater, shields the heater from outside contamination, and provides an electrical contact for a thermocouple.

9 Claims, 1 Drawing Sheet

METALLIZED GRAPHITE HEATER FOR A HIGH-PRESSURE HIGH-TEMPERATURE REACTION VESSEL

RELATED APPLICATIONS

None

BACKGROUND OF THE INVENTION

This invention relates to an improved graphite resistance heater for use in a high-pressure high-temperature reaction vessel. More particularly, this invention relates to a graphite heater having at least a partially metallized surface.

Synthetic diamond, polycrystalline diamond, cubic boron nitride, and other super abrasives that are used in a variety of tools and wear resistant products are manufactured at super high pressures and temperatures in specially designed reaction vessels. The reaction vessels are loaded into high-pressure high-temperature presses capable of exerting pressures on the vessel of between 40 to 80 kilobars. In the course of this process a high electrical current from an external source is passed through a graphite tube heating mechanism within the vessel, known in the art as a heater, raising the temperature within the reaction vessel to within the zone where diamond is thermodynamically stable. Presses of this nature are well known in the art as belt, cubic, and prismatic presses, or variations thereof.

The graphite heater is positioned concentrically inside the reaction vessel and subjected to ultra high pressures and temperatures. A payload consisting of diamond, polycrystalline diamond, cubic boron nitride, or other super material is loaded inside the graphite heater where temperatures will be the highest. The graphite heater has thin walls in order to present a resistance path for the high electrical current, thereby creating heat inside the vessel. As the pressure is increased on the reaction vessel, the vessel and its components consolidate, often causing the thin, fragile walls of the heater to fracture. Contaminants from the surrounding components are forced into these fractures, interrupting the current path through the heater. Fractures in the heater and contaminants cause hot and cold spots along the surface of the heater, and are also linked to failure of the heater altogether. Uneven heating of the payload is a cause of low product yields from the press, and heater failure has been attributed to anvil breakage and catastrophic failures during the high-pressure high-temperature press cycle.

Another deficiency with the graphite heater arises when the reaction vessel is fitted with a thermocouple. The wires of the thermocouple are positioned in contact with the graphite heater and rely on the graphite tube for an electrical connection. But at the temperatures reached in the high-pressure high-temperature process, the materials of the wire react with the graphite causing erratic and inconsistent readings. Again poor temperature control within the reaction vessel is another cause of low product yields.

Therefore, it is desirable to strengthen the heater in order to increase product yields and to reduce anvil breakage and catastrophic failure during the operation of high-pressure high-temperature press apparatus. This invention overcomes the propensity of the graphite heater to fracture during the high-pressure high-temperature process. This invention provides a heater having a metallized surface that constrains the graphite tube during consolidation under pressure, imparts toughness to the graphite, shields the graphite tube from outside contamination, and provides an improved electrical contact when a thermocouple is fitted into the reaction vessel. Additionally, it accommodates higher current that will permit faster heating of the payload.

SUMMARY OF THE INVENTION

This invention presents a high-pressure high-temperature reaction vessel having at least a partially metallized graphite heater for improved performance. The metallized heater comprises a graphite tube that may be at least partially metallized either by coating the graphite tube with a refractory metal, by intermixing a refractory metal with the graphite, or by positioning a refractory metal sheet or cylinder adjacent the graphite tube. The refractory metal promotes containment of the graphite during consolidation in the high-pressure press; adds toughness to the heater, shields the heater from outside contamination, and provides an electrical contact for a thermocouple when fitted into the reaction vessel. The refractory metal cylinder, sheet, or coating may be either inside and or outside the graphite tube, and it may consist of more than one layer.

DETAILED DESCRIPTION OF THE INVENTION

Figure 1:
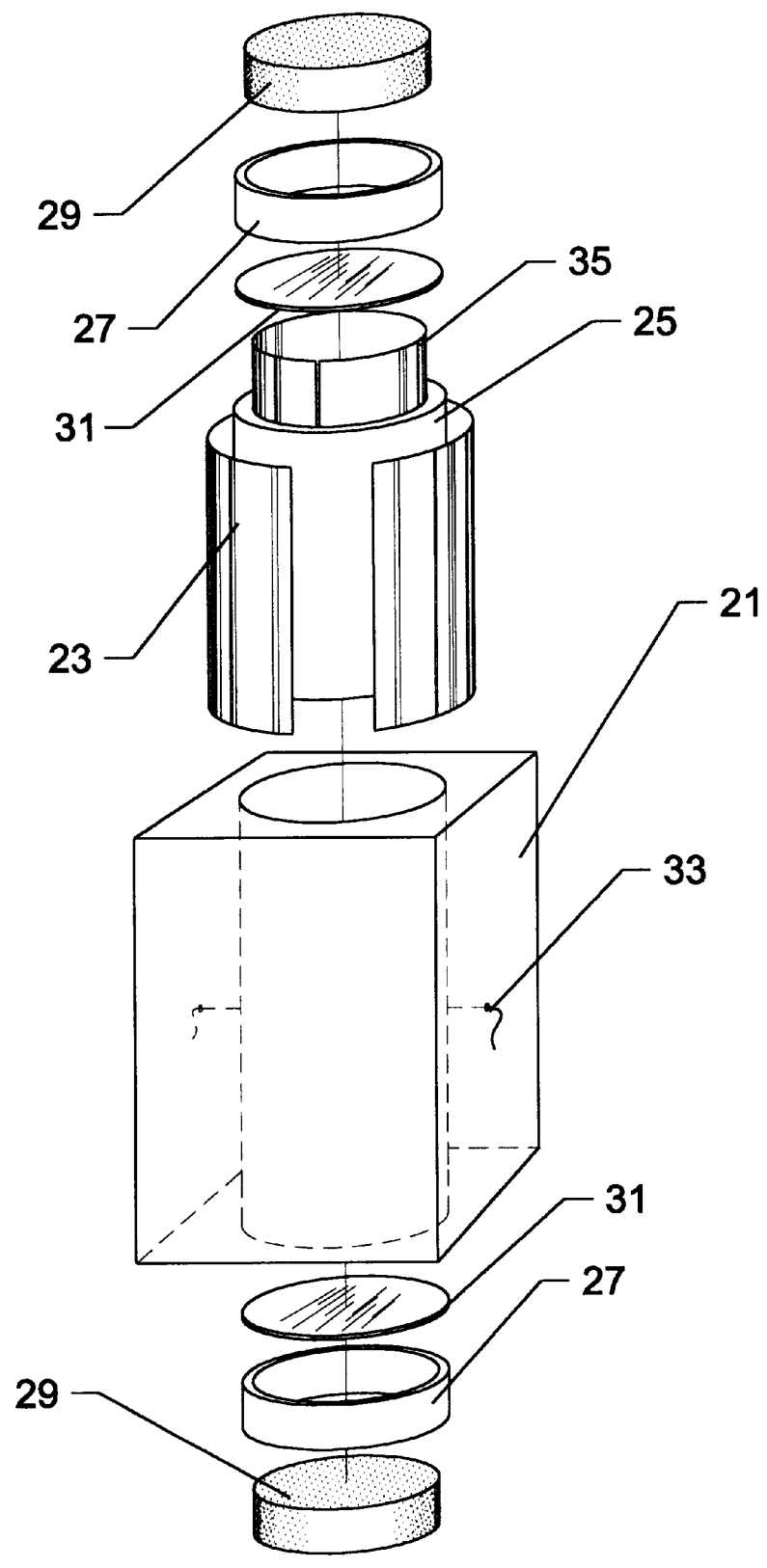
FIG. 1 is an illustration of a high-pressure high-temperature reaction vessel depicting a metallized graphite heater of the present invention.

This invention presents a high-pressure high-temperature reaction vessel having at least a partially metallized graphite heater for improved performance. A high-pressure high-temperature reaction vessel typically includes a graphite tube, known as a heater. The graphite tube is positioned inside the reaction vessel and disposed so as to be in electrical contact with an external electrical power source. The walls of the tube present a resistance path to the current passing through the reaction vessel generating heat. When the reaction vessel is placed inside a high-pressure high-temperature press apparatus, the pressure exerted by the press on the reaction vessel will often cause fractures in the brittle walls of the heater. Such fractures interrupt the current path through the heater, and contaminants from the other components of the vessel are forced into these fractures, causing cold and hot spots along the surface that result in uneven heating of the payload and even premature failure of the heater, itself. The metallized heater of this invention corrects these deficiencies.

The metallized heater of the present invention comprises a graphite tube at least partially metallized either by a coating of a refractory metal, by intermixing a refractory metal with the graphite, or by positioning a refractory metal sheet or cylinder adjacent the graphite tube. The refractory metal used in this invention is selected from the group consisting of Ti, Zr, Hf, V, Nb, Ta, Cr, Mo, W, Re, or combinations or alloys thereof. These refractory metals are often found in other components within the reaction vessels known in the art and are easily adaptable to metalization of the heater. Coating of the tube may be accomplished by any means known in the art such as by sputter coating or vapor deposition techniques. Another means of metallizing the graphite heater is to mix the refractory metal into the graphite at the time the graphite tube is manufactured. In the art it has been the practice to only use a tube consisting of nearly 100% graphite. This invention presents a departure from that practice, and discloses a tube having greater than 80% graphite, preferably greater than 50% graphite intermixed with a refractory metal. Another means of metallizing the heater is to position a sheet or cylinder of a refractory metal adjacent the heater within the reaction vessel. As the temperature inside the reaction vessel rises, the metal reacts with the graphite forming an intimate bond on the surface of the heater. The metallized surface of the graphite heater should be at least 0.0001", preferably 0.002", preferably not greater than 0.025" thick in order to enhance the performance of the heater during the high-pressure high-temperature process.

FIG. 1 is an illustration of a high-pressure high-temperature reaction vessel depicting a metallized heater of the present invention. The reaction vessel comprises a natural or synthetic prismatic receptacle 21, known in the art, adapted to accept the remaining components of the vessel. Metallization is provided by means of a refractory metal sheet 23 wrapped around the graphite heater 25. Inside the heater is another sheet 35 of the refractory metal. The graphite tube is now constrained within the two metal wraps. As pressure in applied to the vessel, the metal wraps serve to constrain the graphite tube and protect it from fracturing during the high-pressure high-temperature process. As the temperature within the reaction vessel rises, the metal wraps will react with the graphite and intimately bond to the tube adding greater toughness to the otherwise brittle graphite. The heater is also shielded from contamination that might come from the other components of the vessel. The remaining components such as the metal disk 31 and the metal ring 27 serve to complete the current path from the external electrical power source. The cylinders 29 are positioned in the ends of the vessel and serve to pin the components within the vessel in place. A thermocouple may also be desirable in order to monitor the temperature within the vessel. The thermocouple wire 33 is fitted into the prismatic receptacle and positioned in electrical contact with the metallized heater.

Other variations of the present invention are readily ascertainable though not depicted. For example, a refractory metal cylinder may be substituted for the metal wrap. It may be desirable to use only one wrap or cylinder either inside or outside the heater. Also, more than one layer may be desired. Alternatively, the graphite tube may be provided with a refractory metal coating, or have the refractory metal inter-mixed with the graphite, eliminating the need for the wrap or the cylinder. Or these elements may be used in combination in order to achieve the greatest protection of the heater.

The descriptions of the present invention are offered here by way of illustration only and not by way of limitation. Those skilled in the art will recognize the utility of this invention in the various high-pressure high-temperature reaction vessel configurations currently in use, and the adaptability of this invention to configurations yet to be put into production. This disclosure is intended to cover all such applications of the present invention.

What is claimed:

1. A metallized graphite heater for use in a high-pressure high-temperature reaction vessel, comprising:
    a. a graphite tube for use as a resistance heater;
    b. at least a portion of the graphite tube having a metallized surface;
    c. the metallized surface being provided by a refractory metal coating, by intermixing a refractory metal in the graphite, or by positioning a refractory metal sheet or cylinder adjacent the graphite tube; and
    d. the metallized heater being inter-disposed within a high-pressure high-temperature reaction vessel.

2. The refractory metal of claim 1 selected from the group consisting of Ti, Zr, Hf, V, Nb, Ta, Cr, Mo, W, Re, or combinations or alloys thereof.

3. The refractory metal of claim 1 comprising more than one layer.

4. The refractory metal sheet or cylinder of claim 1 being positioned both inside and or outside the graphite tube.

5. The refractory metal of claim 1 being in electrical contact with a thermocouple that may be inserted into the high-pressure high-temperature reaction vessel.

6. The metallized heater of claim 1 being used in a reaction vessel adapted for a belt, cubic, or prismatic press, or a variation thereof.

7. The metallized graphite heater of claim 1 wherein the reaction vessel is fitted with a thermocouple.

8. The metallized graphite heater of claim 1 wherein the refractory metal has a cross-section thickness of at least 0.0001" but not greater than 0.025".

9. The metallized graphite heater of claim 1 wherein the graphite tube consists of as much as between 50% and 99.9% graphite.

* * * * *